March 11, 1924.

H. LEDBETTER

MECHANICAL MOVEMENT FOR BRAKES

Filed June 23, 1923

1,486,350

Inventor

Higgins Ledbetter

By Browne & Phelps

Attorneys

Patented Mar. 11, 1924.

1,486,350

UNITED STATES PATENT OFFICE.

HIGGINS LEDBETTER, OF DOME, NORTH CAROLINA.

MECHANICAL MOVEMENT FOR BRAKES.

Application filed June 23, 1923. Serial No. 647,332.

*To all whom it may concern:*

Be it known that I, HIGGINS LEDBETTER, a citizen of the United States, residing at Dome, in the county of McDowell and State of North Carolina, have invented certain new and useful Improvements in Mechanical Movements for Brakes, of which the following is a specification.

The invention relates to brake operating mechanism and has as an object the provision of a mechanical movement for operating the brake of a vehicle. A further object of the invention is the provision of a mechanical movement for operating a vehicle which will provide a quick movement of the brake shoe during the first portion of the movement of the lever and a slower and more powerful movement during the latter portion of the movement of the brake lever.

Figure 1:
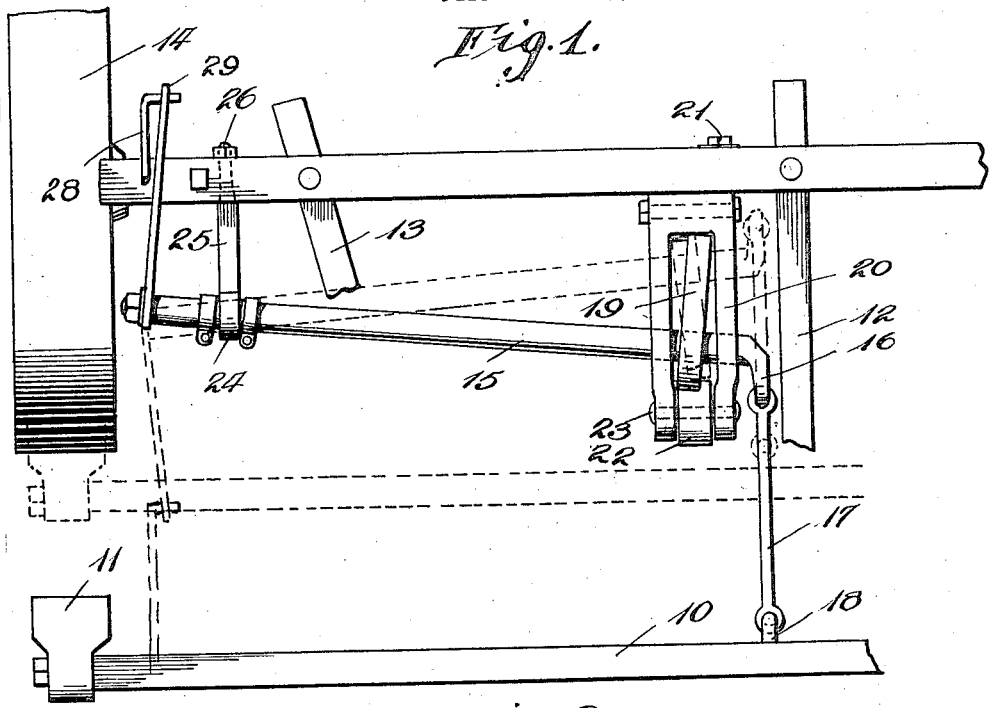
Figure 2:
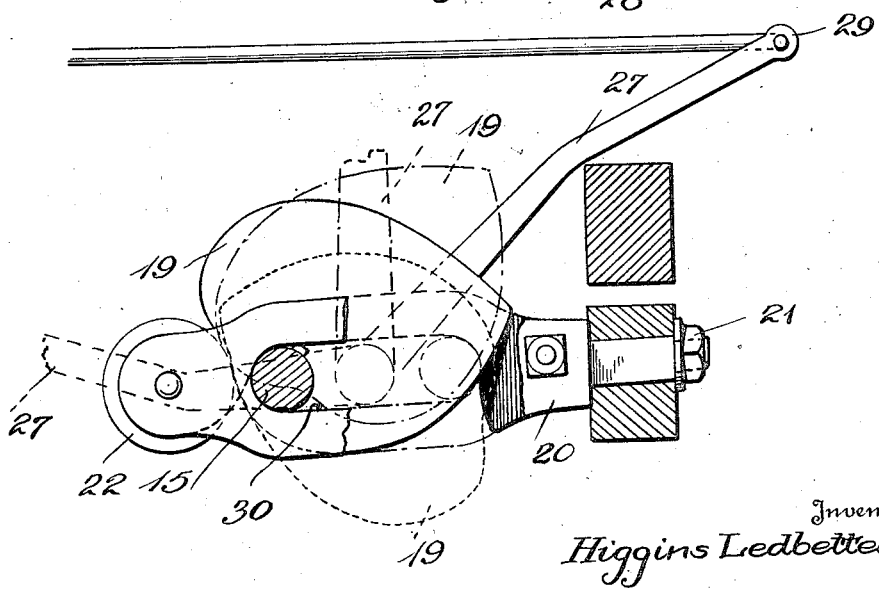

An illustrative embodiment of the invention is shown in the accompanying drawing, in which, Fig. 1 is a detailed plan view of one portion of the rear axle of a wagon with the invention applied thereto, Fig. 2 is a detail vertical section on line 2—2 of Figure 1, partly broken away showing different positions of the device in dotted lines.

The embodiment of the invention shown as applied to a horse drawn wagon and as shown comprises a brake beam 10 having a brake shoe 11 at the illustrated end thereof. For simplicity of showing one half of the rear axle, of the brake beam, and one wheel of the vehicle is omitted. The wagon reach is shown at 12 and one of the braces at 13.

To pull the brake shoe 11 against the wheel 14 of the vehicle there is shown a shaft 15 having a crank 16 at its end connected by means of a link 17 to an eye 18 secured to the brake beam 10.

A movement of translation of the crank 16 when the shaft 15 is revolved, is provided to supply a pull upon the brake beam in addition to what would result from the mere rotation of the shaft 15 and the throw of the crank. To provide such movement or translation there is shown a cam 19 rigidly secured to the shaft 15 and operating between the two legs of a yoke 20 secured to the rear axle as by means of a bolt 21. To act as an abutment for the cam 19 there is shown a roller 22 mounted upon an axis 23 in the ends of the yoke.

The shaft 15 is shown as mounted in an eye 24 carried by the end of an arm 25 terminating in a bolt 26 securely mounted in the rear axle. The eye 24 is of sufficient diameter to allow the necessary play of shaft 15 to vary its angle as clearly shown in Figure 1. The shaft 15 may be caused to rotate by means of an arm 27 having a rod 28 attached to the end 29 thereof which rod may extend to a position adjacent the seat of the driver.

The form of the cam 19 is such that the motion imparted to the brake beam 10 during the first 45° of rotation as shown in Figure 2 will be substantially one half of the entire movement of the beam. The shaft 19 is shown as revolving in and guided in its movement of translation by slots 30 in the arms of the yoke 20.

The relation of parts is preferably such that when the lever 27 has passed to a position wherein the portion thereof which is secured to the end of the shaft 15 is vertical, the brake shoe 11 will have been brought into contact with the wheel. From this position which is the position of greatest power of the lever 27 the motion imparted to the brake beam is much less for each degree of rotation of the lever 27 and therefore the power applied to the brake beam is correspondingly greater. In order to permit of a rotation of 90° from the vertical to the position shown in dotted lines in Figure 2 the lever 27 is shown with a bend in its length.

By virtue of the form of the cam 19 the brake is given a quick movement at the beginning to quickly apply its friction to the wheel and then a slow movement with great increase of power to make the brake effectual upon the progress of the vehicle.

While the device is shown as applied to a horse drawn vehicle it is obvious that many other uses may be found therefor and that minor changes may be made in its physical embodiment without departing from the spirit of the invention.

I claim:

1. A mechanical movement for brakes, comprising, in combination, a shaft, means carried by said shaft adapted to be connected to brake mechanism, a cam upon said shaft providing quick initial and slow final pull upon said connection, a fixed abutment for said cam and means for causing rotation of said shaft and cam.

2. A mechanical movement for brakes, comprising, in combination, a shaft, means for supporting said shaft for rotation and angular movement at one end thereof, means for supporting said shaft for rotation and movement of translation adjacent the other end thereof, means upon said shaft at the latter end connected to brake mechanism, a cam upon said shaft adapted to cause movement of translation of said means upon rotation of the shaft, and a fixed abutment for said cam.

3. A mechanical movement for brakes, comprising, in combination, a shaft, means for supporting one end of said shaft for movement of rotation with change of angular relation, a yoke mounted adjacent the other end of the shaft having slots in its arms, a cam secured to said shaft between the arms of said yoke, an antifriction roller pivoted between the ends of the arms of said yoke, a crank secured to said shaft adjacent said cam adapted to be connected to brake mechanism, said cam adapted to cause quick motion of translation during initial rotation of said shaft and slow motion of translation during subsequent rotation of said shaft.

HIGGINS LEDBETTER.